Figure 1:
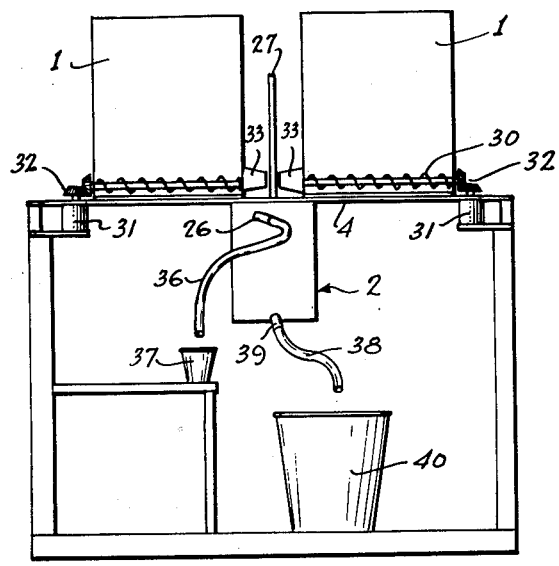

May 19, 1964   P. W. T. BROADHURST   3,133,675
BEVERAGE DISPENSING MACHINES

Filed Nov. 28, 1960   2 Sheets-Sheet 1

Inventor
Peter W. T. Broadhurst
By Stevens Davis Miller & Mosher
Attorneys

United States Patent Office 3,133,675
Patented May 19, 1964

3,133,675
BEVERAGE DISPENSING MACHINES
Peter W. T. Broadhurst, Oakville, Ontario, Canada, assignor, by mesne assignments, to Vendomatic Services Limited, Toronto, Ontario, Canada
Filed Nov. 28, 1960, Ser. No. 72,213
Claims priority, application Canada Sept. 13, 1960
4 Claims. (Cl. 222—129.1)

The present invention relates to machines for preparing and dispensing beverages made up from at least one liquid ingredient and at least one solid ingredient.

A variety of such machines are presently available. They are usually designed to vend drinks formed by the mixing of hot water and an instant ingredient such as instant coffee, tea or chocolate. Upon initiation of a vending cycle, generally by coin-operated mechanism, the machine delivers the drink into a disposable cup which has been brought into an appropriate position by suitable cup-dispensing means. Ideally an instant beverage machine should be so devised as to achieve the following objectives:

(1) Substantially complete mixing of the instant ingredient and the hot water, at the same time however avoiding undesirable foaming. Hot chocolate is not very susceptible to foaming but instant coffee and tea are prone to produce unattractive foam if subjected to too much agitation.

(2) Complete flushing of the mixing device after every vend for sanitary reasons and also to avoid blending of undesirable flavours. For example, chocolate particles can ruin coffee when present therein in small quantities. This means that water must be passed through the mixing system in sufficient quantities and at sufficient velocities to ensure good flushing action. The need to obtain good flushing may make it necessary to accept something less than the substantially complete mixing mentioned above since the design parameters for effective flushing are frequently in opposition to those required for non-turbulent flow.

(3) Removal of steam from the interior of the machine by way of a pre-determined path so as to prevent difficulties arising from the fact that instant ingredients congeal very rapidly into a hard gum-like substance when exposed to minute quantities of steam. Such congealing of the instant ingredients can quickly give rise to defective operation of the apparatus provided for dispensing the instant ingredients.

(4) Ease of manufacture and accessibility for routine cleaning and maintenance in order to comply with sanitation requirements.

It is an object of the present invention to provide a beverage dispensing machine in which the above mentioned objectives are more nearly attained than in previously known machines.

Accordingly the invention provides a beverage dispensing machine comprising a mixing chamber provided with a beverage outlet and having a floor and a peripheral wall extending upwardly from said floor, a rotatable disc mounted within said chamber, liquid ingredient dispensing means arranged to deliver a liquid ingredient on to said disc, and dry ingredient dispensing means arranged to deliver a dry ingredient on to a portion of said floor located externally of the periphery of said disc.

Figure 2:
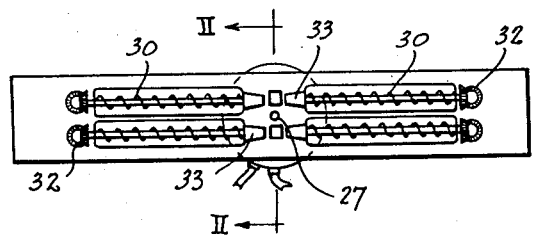
Figure 3:
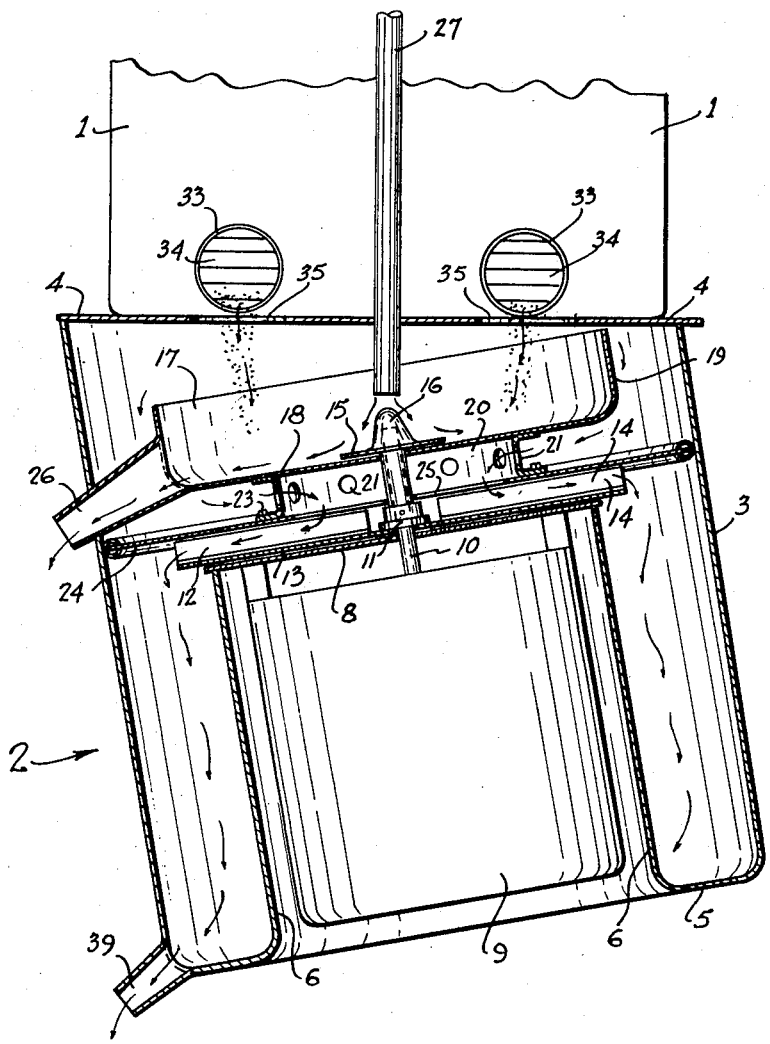

The invention will be described with reference to the accompanying drawings wherein:

FIG. 1 is a simplified side elevational view of one embodiment of a dispensing machine according to the invention, FIG. 2 is a plan view of FIG. 1, and FIG. 3 is a sectional view along the line II—II of FIG. 2.

The machine illustrated comprises four storage chambers 1 for solid ingredients. Each of the containers 1 will normally contain a different solid ingredient which upon admixture with hot water singly or together with another ingredient produces a beverage. For example the four containers may contain instant chocolate, tea and coffee preparations and sugar respectively.

Beneath the containers 1 there is disposed a mixing unit 2. As shown in detail in FIG. 3 this comprises a generally cylindrical outer casing 3, the major axis of which is somewhat inclined at about 10° to the vertical. The upper end of the casing 3 is closed by means of a plate 4, releasably secured thereto, which also serves to support the storage containers 1. At its lower end the casing 3 is turned inwardly to form an annular base portion 5 and then upwardly to form an inner wall 6 of an annular condensing chamber 7. A circular plate 8 is secured adjacent its periphery to the upper edges of the inner wall 6.

Within the space enclosed by the inner wall 6 there is disposed an electric motor 9 the drive shaft 10 of which passes through a central aperture in the plate 8. The shaft 10 has secured thereto a sleeve 11 which is rotatable with the shaft 10. The sleeve 11 is in turn secured to an impeller 12 which comprises a flat disc 13 concentric with the shaft 10 and provided with four radially extending blades 14 which are symmetrically disposed about the surface of the disc 13 and extend upwardly therefrom. To the upper end of the drive shaft 10 is releasably secured a small disc 15 concentric with the shaft 10 and having a hump 16 at its centre.

The disc 15 is arranged centrally of a mixing bowl 17 having a floor 18 concentric with the shaft 10 and a peripheral side wall 19. The floor 18 is inclined at an angle of about 10° to the horizontal. The bowl 17 is supported by a ring shaped member 20 having apertures 21 spaced at intervals around its surface. The upper edge of the ring shaped member 20 is turned over and secured to the lower face of the base 18 of the bowl 17 while the lower edge thereof is turned over and releasably secured by means of screws 23 to an annular plate 24 mounted within the casing 3 and having a circular aperture 25 therein.

The bowl 17 is provided with an outlet nozzle 26 which projects through the side of the casing 3. Water or other liquid may be delivered into the bowl 17 by way of an inlet pipe 27 which passes through the plate 4 and terminates just above the hump 16 of the disc 15.

Within each of the containers 1 there is located near the base thereof an auger 30 which is rotatable by means of an electric motor 30 through suitable gearing 32. The augers 30 serve to deliver the solid ingredients within the containers 1 to nozzle 33 the open ends of which are provided with grilles 34. The plate 4 is provided with apertures 35 by way of which solid ingredients dispensed through the nozzles 33 and grilles 34 can fall into the mixing bowl 17.

The grilles 34 serve to provide a relatively sharp cut-off to the delivery of the solid ingredients at the end of a vend cycle while at the same time in ensuring that the nozzles 33 are well primed for a subsequent vend.

A pipe 36 leads from the outlet nozzle 26 and has its free end so disposed as to deliver into a disposable drinking cup 37 liquid which issues from the nozzle outlet 26. A further pipe 38 leads from an exhaust outlet 39 located at the lowermost portion of the annular condensing chamber 7 and delivers liquid discharged therefrom into a waste pail 40.

The machine illustrated in FIGS. 1–3 operates as follows. During the whole of any period of time that the machine is available for use in dispensing beverages the electric motor 9 operates continuously thereby causing rotation of the impeller 12 and the disc 15 at a speed about 300 r.p.m. The rotation of the impeller 12 causes a current of air to enter the casing 3 by way of the ingredient apertures 35 to move outwardly across the mixing bowl 17. At the periphery of the bowl 17 the air proceeds up and over the side wall 19 of the bowl down between the side wall 19 and the casing 3 to be drawn through the apertures 21 and 25 into the annular condensing chamber 7 which it leaves by way of the exhaust outlet 39. During its passage through the machine the current of air serves to carry along with it any steam, vapour or spray emerging from the inlet pipe 27 or rising from the mixing bowl 17 as indicated by the broken arrows in FIG. 3. Any such condensable material is condensed in the condensing chamber 7 from which it drains by way of the exhaust outlet 39 into the waste pail 40. In this manner moisture is prevented from rising upwardly so as to contact dry ingredients being delivered from, or remaining upon, the grilles 34 thereby rendering unnecessary the provision of flapper doors or the like such as have been used in known instant beverage vending machines.

Upon initiation of a vend cycle the selected auger-driving motor or motors 31 are actuated to deliver a prescribed quantity of solid ingredient or ingredients into the mixing bowl 17 simultaneously with admission of a prescribed quantity of hot water through the inlet pipe 27. The hot water is discharged from the pipe 27 on to the hump 16 from which it flows across surface of the disc 15. The provision of the hump 16 minimises splashing back of the hot water as its downward fall from the pipe 27 is checked. As a result of being subjected to centrifugal forces while in contact with the disc 15, the hot water is thrown outwardly in a whirling stream at a considerable velocity to encounter and dissolve solid ingredients which have been deposited through the apertures 35 onto a part of the mixing bowl 17 located outwardly of the disc 15. The beverage formed by solution of the solid ingredients in the hot water moves to the outer periphery of the bowl 17 where it strikes the side wall 19 and, under the centrifugal forces still acting on it, is then discharged by way of the outlet 26 through the pipe 36 to the drinking cup 37.

The embodiment described attains all of the four objectives mentioned at the outset as desirable in an instant beverage vending machine.

Mixing of instant tea or coffee with hot water can be achieved quickly and substantially completely without the production of an unacceptable amount of foam. This is because the mixing operation is effected without giving rise to a high degree of turbulence.

Satisfactory flushing of the mixing bowl 17 is achieved because the solid ingredients are deposited on a portion of the floor 18 of the bowl located outside the periphery of the disc 15 so that the last portion of the beverage emerging from the outlet nozzle 26 consists substantially of water alone leaving none of the instant ingredient in the mixing bowl.

The controlled removal of steam or other moisture is also effected. In this connection it may be noted that continuous operation of the impeller 12 is highly desirable to ensure removal of any steam remaining in the machine after a vend and also to ensure that the ventilation system is working properly at the beginning of the vend cycle. With intermittent operation of the impeller 12 there would be a delay of some seconds before the impeller accelerated to operating velocity so that complete control of the steam would not be obtained at the beginning of the vend cycle.

Also, if the impeller 12 stopped rotating at the end of each vend cycle residual steam present in the machine would not be removed. It would of course be possible to arrange that the vend initiating and controlling system first switched on the electric motor 9 and allowed it to run for a sufficient length of time prior to operation of the auger-driving motor or motors 31 and prior to admission of hot water through the inlet pipe 27 to ensure that the ventilation system was working adequately before delivery of either solid or liquid ingredients into the mixing bowl 17. It would also be possible to arrange that the electric motor 9 continued to operate and to drive the impeller 12 for a prescribed length of time after a vend cycle has been completed to remove any residual steam. However these expedients would involve not only a complication of the operating mechanism but also a delay in the delivery of the beverage to the customer and it is therefore preferred to have continuous operation of the impeller 12.

Finally it will be noted that the elements of the machine illustrated are readily accessible for cleaning and maintenance. The plate 4 is releasably secured to the casing 3 and can be lifted away therefrom together with the containers 1 and the inlet pipe 27. Removal of the disc 15 from the drive-shaft 10 and removal of the screws 23 then enables the mixing bowl 17 to be lifted out of the machine for cleaning.

The system for initiating and controlling the vend cycle of the machine of FIGS. 1 to 3 is of conventional type and has therefore not been illustrated. Coin operated mechanism causes actuation of one or more of the auger-driving motors 31, in accordance with the nature of the selected beverage, and simultaneously causes actuation of a solenoid valve which supplies hot water from a reservoir to the mixing bowl 17 by way of the inlet pipe 27. A timing device switches off the auger-driving motors 31 and deactuates the solenoid valve controlling the supply of hot water after the prescribed quantities of the solid ingredient or ingredients and the hot water have been supplied to the mixing bowl for the production of a quantity of the beverage in accordance with the volume of the cup 37.

The embodiments of the invention described with reference to FIGS. 1–3 is shown merely by way of illustration and modifications can obviously be made thereto without departing from the scope of the invention.

I claim:

1. A beverage dispensing machine comprising a cylindrical mixing bowl with a flat bottom and an upstanding peripheral wall extending therearound, a small rotatable mixing disc centrally mounted in said bowl and contiguous to said flat bottom, said disc being substantially smaller than the bottom of said bowl so a substantial portion of said bottom surrounding said disc is exposed to receive a dry ingredient thereon, dry ingredient dispensing means disposed vertically above the exposed portion, said dispensing means being disposed laterally in spaced relationship with the outer edge of said disc to prevent impingement of the dry ingredient thereon, liquid ingredient dispensing means disposed in vertical alignment above said disc for discharging liquid thereon, and discharge means located in the lowest portion of said bowl for passing the mixed beverage therefrom.

2. A beverage dispensing machine according to claim 1 wherein said disc is provided with a hump centrally thereof and said liquid ingredient dispensing means is arranged to deliver the liquid ingredient on to said hump.

3. A beverage dispensing machine according to claim 1 having a condensing chamber located below said mixing bowl and ventilation means for withdrawing vapours from said mixing bowl into said condensing chamber.

4. A beverage dispensing machine according to claim 1 having a condensing chamber located below said mixing bowl, an impeller for withdrawing vapours from said mixing bowl into said condensing chamber, and motor means in driving connection with both said impeller and said disc.

References Cited in the file of this patent
UNITED STATES PATENTS

| | | |
|---|---|---|
| 2,460,605 | Soissa | Feb. 1, 1949 |
| 2,755,000 | Parre | July 17, 1956 |
| 2,796,200 | Lambert et al. | June 18, 1957 |